United States Patent Office 3,170,439
Patented Feb. 23, 1965

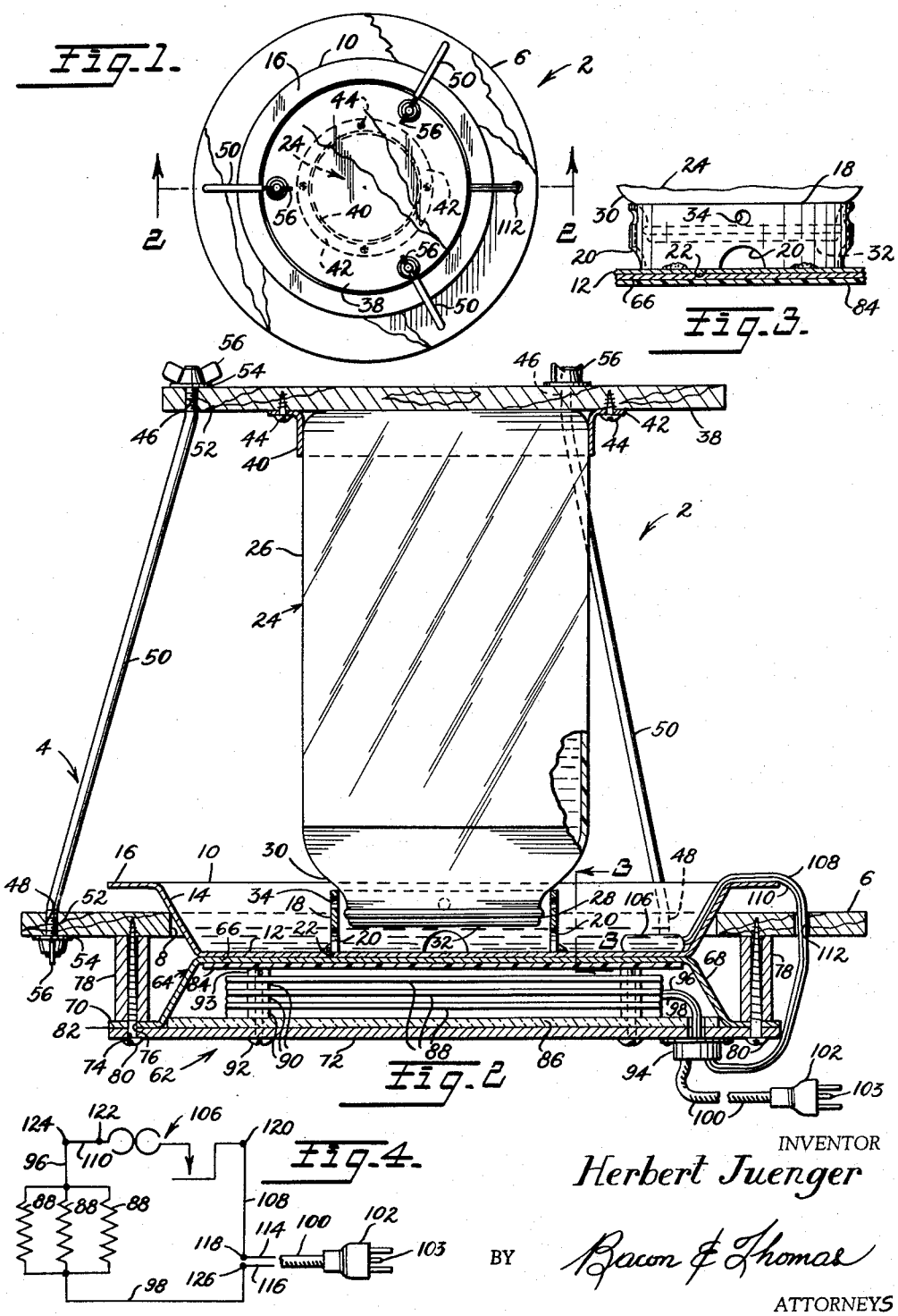

3,170,439
WINTER BIRD WATERING STATION AND BATH
Herbert Juenger, Ketchan Ave., Mountainville, N.Y.
Filed Aug. 9, 1963, Ser. No. 301,124
10 Claims. (Cl. 119—73)

This invention relates generally to a bird watering station and bath, and more particularly to an improved, heated, automatically operated winter bird watering station and bath constructed for outside use in sub-freezing temperatures.

The provision of outdoor watering stations and baths for birds during the relatively warm periods of the year presents no great problem, and numerous devices have been proposed for this purpose. However, in sub-freezing weather commonly available outdoor stations will freeze, and hence will become inoperative for their intended purpose. The station of the present invention is constructed to remain operative outdoors, even in the presence of sub-freezing temperatures, and is automatic in operation.

The watering station and bath of the invention includes a supporting framework, within which is mounted a watering tray and an inverted water storage container. Secured to the underside of the supporting frame, and in contact with the bottom of the watering tray, is a uniquely constructed electrical heating apparatus, which has a capacity sufficient to prevent water contained within the tray and the storage container from freezing in sub-freezing temperatures. A thermostatic switch is disposed within the watering tray, and is connected to automatically operate the heating mechanism in response to temperature changes of the water within said tray.

It is an object of this invention to provide an automatically operated, outdoor bird watering station and bath which will provide unfrozen water in the presence of sub-freezing atmospheric temperatures.

A further object is to provide a winter bird watering station and bath which is capable of standing prolonged exposure to adverse weather conditions.

Another object is to provide an automatically operated, structurally uncomplicated heating apparatus for a bird watering station and bath.

It is also an object to provide a heated bird watering station and bath, which is relatively economical to construct.

Other objects and many of the attendant advantages of the invention will be readily understood from the following detailed description, taken in conjunction with the accompanying drawings, wherein:

FIG. 1 is a top, plan view of the station of the invention;

FIG. 2 is a vertical sectional view, taken along the line 2—2 of FIG. 1, showing in detail the construction of the station of the invention;

FIG. 3 is an enlarged vertical sectional view, taken along the line 3—3 in FIG. 2; and FIG. 4 is a schematic diagram of the heating apparatus of the invention.

Referring now to the drawings, the outdoor, winter bird watering station and bath of the invention is indicated generally at 2, and includes a supporting frame 4. The frame 4 includes a base plate 6, which is shown in FIG. 1 to have a circular configuration. The base plate 6 can be constructed of marine plywood, or some other suitable material, and has a centrally positioned circular opening 8 extending therethrough.

Supported by the base plate 6 is a watering tray 10, said tray preferably being constructed from metal, and including a bottom plate 12, and frusto-conical side wall 14 that terminates at its upper end in an annular flange, or rim, 16. The frusto-conical side wall 14 of the tray 10 is receivable within the opening 8, and said opening 8 has a diameter equal to the external diameter of said side wall at a little more than midway the height thereof. Thus, when the tray 10 is received within the opening 8, the lower end thereof will project downwardly from the bottom of the base plate 6, and the annular rim 16 will be vertically spaced from the top of said base plate.

Secured to the center of the bottom plate 12, and projecting upwardly therefrom, is a cylindrical centering and supporting ring 18, said ring being secured to the tray 10 by soldering, or by some other suitable means. The ring 18, as is best shown in FIGS. 2 and 3, has a plurality of circumferentially spaced, arcuate flow openings 20 extending inwardly from the lower end face 22 thereof.

Received within the upper end of the ring 18 is an inverted water storage container, or jar, 24, said jar including a cylindrical body 26, a reduced neck portion 28, and a tapering portion 30 interconnecting said body 26 with said neck portion 28. The diameter of the ring 18 is slightly greater than the external diameter of the neck portion 28 of the container 24, and the tapering portion 30 of said container rests on the upper end of said ring 18.

The vertical height of the ring 18 is sufficient so that the lower end 32 of the container 24 will be positioned above the bottom plate 12 a distance equal to the desired depth of liquid within the tray 10. The ring 18 has a plurality of circumferentially spaced air relief ports 34 therein, positioned above the lower end 32 of the container 24.

Disposed to rest upon the upper end of the container 24 is a circular top plate 38, said plate 38 having a diameter less than that of the rim 16. The top plate 38 can be constructed from marine plywood, or from some other suitable material. A cylindrical centering ring 40 is secured to the underface of the top plate 38, said centering ring having on its upper end a radially projecting flange 42, and being secured in position by screws 44. The centering ring 40 has an inner diameter slightly greater than the external diameter of the upper end of the container 24.

The top plate 38 has three circumferentially spaced bores 46 extending therethrough, and the base plate 6 has three circumferentially spaced bores 48 therein, positioned to lie on a circle having a greater radius than the circle on which the bores 46 lie. The opposite, threaded, angled ends 52 of a tie rod 50 are received within each pair of bores 46 and 48, and are secured in position by washers 54 and wing nuts 56. The tie rods 50 function to secure the top plate 38, the base plate 6, the container 24, and the watering tray 10 in position.

Secured to the underside of the base plate 6 is the heating apparatus 62 of the invention, said apparatus including an inverted metal pan, or shield, 64. The shield 64 includes an end wall 66 and a frusto-conical side wall 68, the latter terminating at its lower end in an annular flange 70. A circular cover plate 72 is disposed to engage the annular flange 70, and has an outer diameter corresponding to that of said flange.

The cover plate 72 and the flange 70 have circumferentially spaced, aligned bores 74 and 76 therethrough, respectively, and cylindrical spacers 78 are positioned between the flange 70 and the bottom face of the base plate 6 in alignment with each pair of said bores 74 and 76. Screws 80 extend through the bores 74 and 76 and the spacers 78, and are threaded into the base plate 6, to secure the shield 64 in position. A suitable sealing compound 82 is applied to the mating edges of the cover plate 72 and the flange 70 to render the chamber defined by said cover plate and said shield 64 watertight. The spacer 78 has a vertical height sufficient to position the end wall 66 for engagement with the bottom plate 12 of the watering tray 10 when the latter is positioned within the opening 8.

A thin mica shield 84 is disposed within the shield pan 64 for electrical insulation purposes, and is secured by suitable means, such as an adhesive, to the end wall 66 thereof. A sheet 86 of insulation material is disposed to rest between the upper surface of the cover plate 72, and three tube-like, conventional heating elements 88 are positioned between the insulation sheet 86 and the mica shield 84, and extend horizontally. The heating elements 88 are separated by spacers 90, and are secured in position by screws 92 which pass through aligned bores in the cover plate 72 and the insulation sheet 86, and which have nuts 93 threaded on the upper ends thereof.

A junction box 94 is secured to the exterior of the cover plate 72, and contains a plurality of terminals. A pair of leads 96 and 98 extend from the junction box 94, and the heating elements 88 are connected in parallel thereacross. A three-wire cable 100 has one end thereof connected to the junction box 94, and is furnished at its opposite end with a conventional grounded male plug 102. The grounded plug 102 is receivable within a conventional power supply female socket, whereby to furnish power to the heating elements 88, and also functions together with the three-wire cable 100 to ground the junction box 94; the plug 102 has a grounding prong 103 thereon.

When electrically is supplied to the heating elements 88 water contained within the watering tray 10 and within the container 24 will be heated. The bottom plate 12 of the watering tray 10 is in engagement with the end wall 66 of the pan shield 64 over a substantial area of contact, and hence favorable heat transfer characteristics are present between the heating elements 88 and water disposed within the watering tray 10. This large area of contact between the watering tray 10 and the heating apparatus 62 insures that water within said tray will be uniformly heated, and that hence no cold spots will be present at which ice formation can occur. Thus, the station of the invention is constructed to remain ice-free, even in the coldest of weather.

The heating apparatus 62 of the invention is automatically controlled by a thermostatic switch arrangement. Referring again to the drawings, a thermal responsive switch unit 106 is disposed within the watering tray 10. A pair of leads 108 and 110 extend from the switch 106, pass through a bore 112 in the base plate 6, and are connected to the junction box 94. The thermal responsive switch 106 is of a commercially available type, and is constructed to close the circuit to the heating elements when the temperature of the water within the tray 10 drops below 35° F. and to open said circuit when the temperature of the water rises to above 40° F.

The electric circuit of the heating apparatus 62 is shown in schematic form in FIG. 4, wherein are shown the heating elements 88, and the thermal responsive switch 106. The cable 100, which has the male plug 102 connected to one end thereof, includes a pair of leads 114 and 116. The lead 114 is connected to a common terminal 118, which is mounted within the junction box 94.

The lead 108 extends from the terminal 118, and is connected to one terminal 120 of the thermal responsive switch 106. The lead 110 is connected to the other terminal 122 of the switch 106, and extends to a common terminal 124, which is also contained within the junction box 94.

The lead 96 is connected at one end to the common terminal 124, and has its other end connected to the heating elements 88. The lead 98 extends from the heating elements 88 to a common terminal 126 contained within the junction box 94, to which is also attached the other power lead 116.

From an examination of FIG. 4, it is apparent that, upon closing of the thermally activated switch 106, a circuit will be completed through the heating elements 88, and that said circuit will be broken when the thermal switch opens. While the heating elements 88 are shown to be connected in parallel across the leads 96 and 98, it is to be understood that if desired, they can instead be connected in series.

It is thus readily seen that an outdoor, winter watering station and bath for birds has been provided which is automatic in operation, and which will uniformly heat the water within the watering tray during periods of freezing and sub-freezing atmospheric conditions. The station of the invention is ruggedly constructed, and can withstand prolonged exposure to adverse weather. The base plate 6 and the top plate 38 function to shield the supply container 24, and the portion of the base plate 6, which extends radially outwardly from the rim 16 of the watering tray 10, provides a convenient perch for use by visiting birds. The station 2 can be disposed to rest upon a suitable support, or can be suspended by the top plate 38 to hang below a tree branch or some other supporting member.

Obviously, many modifications and variations of the present invention are possible in the light of the above teachings. It is therefore to be understood that, within the scope of the appended claims, the invention may be practiced otherwise than as specifically described.

I claim:
1. A bird watering station and bath, comprising: a base plate having a central opening therethrough, said opening being spaced inwardly from the periphery of said plate to provide a bird perch; a tray disposed on said base plate, and including a frusto-conical portion received within and extending through said opening; a supporting cylinder disposed to rest upon and secured to said tray, said cylinder having a smaller diameter than that of said tray and being adapted to support an inverted liquid supply container; and heater means spaced from and secured to the underside of said base plate to confront said central opening, the bottom of said tray being in direct engagement over a major portion of the area thereof with said heater means, said heater means including: an inverted pan supported below said base plate in spaced relationship; a cover plate secured to the lower end of said pan, and together with said pan defining a chamber; and at least one electrical heating element mounted within said chamber.

2. The combination, as recited in claim 1, wherein said chamber is watertight.

3. The combination, as recited in claim 1, including additionally means for automatically controlling the operation of said heating element in response to the temperature of liquid contained within said tray.

4. The combination, as recited in claim 3, wherein said automatic controlling means include a thermal responsive switch disposed within said tray, and connected electrically with said heating element.

5. The combination, as recited in claim 1, wherein said tray includes a radially extending bottom wall and said pan includes a radially extending end wall, said bottom wall being engageable with said end wall, and said end wall being at least coextensive with said bottom wall.

6. A bird watering station and bath, comprising: a base plate having a central opening therethrough; a tray disposed on said base plate, and including a frusto-conical portion received within and extending through said opening, and a radially extending bottom wall; a vertically disposed supporting cylinder disposed to rest upon and secured to said bottom wall, said cylinder having a plurality of flow openings therethrough at the lower end thereof; a liquid supply container supported by said cylinder, and including a reduced neck portion, said container being disposed in inverted position over said tray with said neck received within the upper end of said cylinder; means for securing together said base plate, said tray and said inverted container; heater means spaced from and secured to the undersurface of said base plate in engagement with said bottom wall; and means for automatically controlling the operation of said heater means in response to the temperature of liquid disposed within said tray.

7. The combination, as recited in claim 6, wherein said tray further includes an annular rim on the upper end thereof, said rim being spaced from said base plate when said frusto-conical portion is seated within said opening.

8. The combination, as recited in claim 6, wherein said cylinder has a height sufficient to position the lower end of said container in spaced relationship above said bottom wall, and wherein said cylinder additionally has at least one air relief port therethrough positioned above said lower end of said container.

9. The combination, as recited in claim 6, wherein said securing means comprises: a top plate disposed to rest on the upper end of said container; means on said top plate for centering it on said container; and a plurality of tie rods interconnecting said top plate with said base plate.

10. The combination, as recited in claim 6, wherein said heater means comprises: an inverted pan secured in spaced relationship below said base plate, and including an end wall disposed in engagement with said bottom wall of said tray; a cover plate secured to extend across the lower end of said pan, and together therewith defining a chamber; at least one electrical heating unit supported within said chamber; and means for supplying electrical energy to said heating unit.

References Cited by the Examiner
UNITED STATES PATENTS

| | | | |
|---|---|---|---|
| 987,551 | 3/11 | Chambers | 119—77 |
| 1,458,450 | 6/23 | Unger et al. | 119—73 |
| 2,105,403 | 1/38 | Buckle | 119—73 |
| 2,511,721 | 6/50 | Langenbahn | 119—73 |
| 2,665,366 | 1/54 | Cleveland | 119—73 |

SAMUEL KOREN, *Primary Examiner.*
HUGH R. CHAMBLEE, *Examiner.*